United States Patent Office 3,491,143
Patented Jan. 20, 1970

3,491,143
ESTERIFICATION PROCESS
Ross A. Kremer, Belle Mead, and William C. L. Wu, East Brunswick, N.J., assignors to Mobil Oil Corporation, a corporation of New York
Filed Sept. 7, 1966, Ser. No. 577,696
Int. Cl. C07c 69/82; C08g 17/08
U.S. Cl. 260—475
17 Claims

ABSTRACT OF THE DISCLOSURE

A catalyst combination of certain tin compounds and alkylamines, exemplified by stannous oxalate and diisopropylamine, suppresses the formation of undesired glycol ethers in the esterification of terephthalic acid, etc. with glycols; the tin compound may be retained or a polycondensation catalyst added for polymerization of the esterification product.

---

Figure 1:
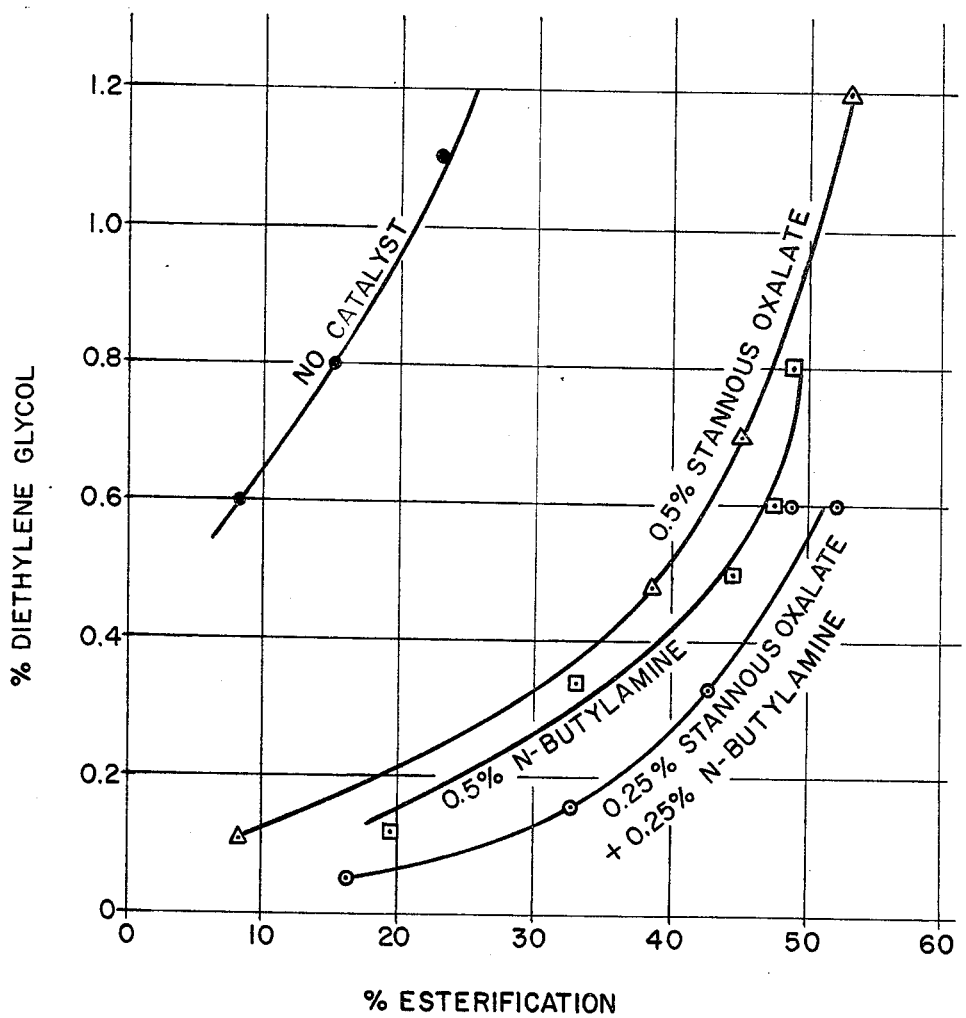

This invention relates to a process for preparing esters of aromatic dicarboxylic acids, particularly terephthalic acid, that are useful in the production of film- and fiber-forming linear polyesters.

It is well known that glycol esters from which film- and fiber-forming polyesters of aromatic dicarboxylic acids are produced can be prepared by directly esterifying the aromatic dicarboxylic acid with a glycol or by first esterifying the aromatic dicarboxylic acid with a monohydric alcohol and then transesterifying the resulting diester of the acid with a glycol. Although direct esterification of the aromatic dicarboxylic acid with a glycol has the obvious advantage of not requiring intermediate conversion of the acid to a diester, it has been previous commercial practice, particularly in the case of terephthalic acid, to prepare the glycol esters by the indirect process.

One reason that has favored use of the indirect process for the esterification of terephthalic acid is that the presence of even small amounts of impurities have a highly deleterious effect on the polymeric product, and terephthalic acid is a high melting compound which does not lend itself to ready purification by conventional techniques. Since the esterification of terephthalic acid with lower alkanols such as methanol takes place without substantial side reactions, and the resulting dialkyl terephthalates can be conveniently purified by conventional methods such as distillation and crystallization, it has been generally considered more practical to purify the acid indirectly as its dialkyl ester. However, more recently developed methods provide terephthalic acid having a very high purity sufficient for use of the acid in production of film- and fiber-forming polyesters from glycol terephthalates prepared by direct esterification of the acid with a glycol, and the substantial economic advantage of eliminating intermediate conversion of the acid to a diester which must then be transesterified has redirected attention to the direct esterification method for producing glycol terephthalates.

In general, the direct esterification of an aromatic dicarboxylic acid with a glycol is carried out with the use of a catalyst which accelerates the esterification reaction. Unfortunately, many of such catalysts also promote the formation of side products which deleteriously affect the properties of polymers obtained by polycondensation of the desired esterification products. For example, it is known that esterification of an aromatic dicarboxylic acid with a glycol can be expedited by certain dehydrating agents, the most commonly used being mineral acids such as sulfuric acid. However, sulfuric acid and other dehydrating agents also promote undesirable side reactions of the divalent glycol that form ether linkages which, under polycondensation conditions, become a part of the resulting polymeric product and adversely affect its hydrolytic stability, ultraviolet light stability and hot-wet ("wash and wear") and dye retention properties. Since the esterification and subsequent polymerization steps are customarily integrated in the production of aromatic dicarboxylic acid polyesters, whereby impurities present in the glycol esters of the aromatic dicarboxylic acid become a part of the polymeric product, it would be highly desirable to accelerate the direct esterification by the use of a catalyst which would not promote or, even more desirably, which would inhibit side reactions that would otherwise render the ultimate polymeric product less suitable for use in films and/or fibers. The present invention, which provides a process that is carried out with such a catalyst, is herein described with particular reference to the esterification of terephthalic acid. However, it should be understood that description of the present process with reference to such a specific aromatic dicarboxylic acid is merely for purposes of illustration and that the present invention is useful for esterification of a great variety of aromatic dicarboxylic acids including, for example, other benzene dicarboxylic acids such as phthalic acid and isophthalic acid, naphthalene dicarboxylic acids such as naphthalic acid, other polynuclear aromatic dicarboxylic acids such as p,p'-isopropylidene dibenzoic acid and 4,4'-bibenzoic acid, and substituted derivatives of such aromatic dicarboxylic acids having one or more additional ring substituents that are stable under the conditions of the process of this invention.

The present invention is based on the discovery of a novel two-component catalyst system which substantially accelerates the direct esterification of an aromatic dicarboxylic acid with a glycol and which does not significantly promote, but generally inhibits, undesirable side reactions such as the glycol etherification reaction. Even more unexpectedly, it has been found that the process of this invention can be carried out with use of the novel catalyst system with production of a smaller amount of undesirable side products than that obtained by use of an equivalent amount of either of the components of the catalyst system. Expressed otherwise, the catalyst system of this invention includes two components which enhance the effect of each other in suppressing undesirable side reactions while accelerating the desired esterification reaction.

The present invention is a process for the esterification of an aromatic dicarboxylic acid, for example terephthalic acid, with a glycol, for example an alkylene glycol, which comprises heating a mixture of the aromatic dicarboxylic acid and at least about 1, and preferably at least about 1.2 moles of the glycol per mole of the aromatic dicarboxylic acid under esterification conditions and in the presence of an organic base and a tin compound containing at least one tin-to-oxygen bond. In a preferred embodiment, the process of this invention is carried out under esterification conditions which include a reaction temperature of at least the normal boiling point of the glycol and a pressure of at least the partial vapor pressure of the glycol in the mixture at the reaction temperature.

In order to appreciate the present invention, it is necessary to understand that merely achieving the esterification of an aromatic dicarboxylic acid with a glycol is not enough to provide a product suitable for use in a polycondensation process for production of fiber- and film-forming polyesters. In order to achieve that objective, it is necessary that the acid be rapidly esterified to the desired degree while minimizing the formation of side products such as ethers which would undesirably affect the properties of the ultimate polymeric product. Thus, the relative rates with which the desired esterification reaction and undesirable (e.g. etherification) reactions take place in the presence of a given esterification catalyst are critical to the properties of the polymeric products obtained by polycondensation of the glycol esters produced with the use of such a catalyst. In view thereof, it can be readily appreciated that the availability of a process which, by the use of two esterification catalysts, produces a ratio of glycol esters to undesirable side products that is higher than the ratio obtained by use of an equivalent amount of only one of such catalysts is of considerable significance with respect to the quality of polymeric products derived from the glycol esters.

In carrying out the process of this invention, the glycol is preferably initially present in the reaction mixture in moderate excess with respect to the amount of the aromatic dicarboxylic acid to be esterified. The presence of a substantial excess of the glycol, in addition to being uneconomical, favors the formation of undesired etherification products. Accordingly, the process of this invention is normally carried out with from 1 to 3 moles of glycol per mole of the aromatic dicarboxylic acid initially present in the reaction mixture, and preferably with from 1.2 to 1.7 moles of glycol per mole of the acid.

Although the process of this invention can be most advantageously carried out with the use of ethylene glycol as the glycol reactant, any alkylene glycol, and preferably symmetrical difunctional glycols may be used. Particularly suitable are the lower alkylene glycols that contain 2 to 6, and preferably 2 to 4 carbon atoms, or mixtures thereof. Such glycols include ethylene glycol, 1,3-propylene glycol, 1,4-butane-diol, and mixtures thereof.

The organic base that is employed in the process of this invention is preferably a primary, secondary or tertiary alkylamine and, as used herein, alkylamines are intended to include cycloalkylamines. Since essentially all of the organic base is desirably removed from the reaction mixture by volatilization, for example by distillation or evaporation, prior to polycondensation of the esterification product, the base is conveniently more volatile than the reactant glycol, i.e., it preferably has a normal boiling point that is lower than that of the glycol. Specific examples of amines that are most suitably employed as the organic base includes the lower alkylamines which contain alkyl groups having one to four carbon atoms, such as n-butylamine, t-butylamine, diisopropylamine, di-n-propylamine, di-n-butylamine, diisobutylamine, trimethylamine, triethylamine and tripropylamine. Amines such as triethylamine, diisopropylamine, di-n-butylamine and tripropylamine which boil at a temperature that is substantially intermediate between room temperature and the boiling point of the glycol reactant are particularly preferred as they can be more conveniently removed from the esterification mixture prior to polycondensation thereof, thereby giving rise to ultimate polymeric products of superior color characteristics.

The tin compound that is used in the process of this invention contains, as aforesaid, at least one tin-to-oxygen bond. Examples of such compounds are the oxalates, alkoxides (preferably containing from 1 to 8 carbon atoms in each alkoxy group) and oxides of tin. Particularly preferred for use in the present process are divalent tin compounds such as stannous oxalate, dimethoxy tin, diethoxy tin, diisopropoxy tin, di-n-butoxy tin, and stannous oxide.

The tin compound and the organic base can be present in the reaction mixture in any amounts and proportions that are productive of the desired high ratio of esterification products to by-product ethers, and particularly of such a ratio that is higher than that obtained with an equivalent amount of either the base or the tin compound. Good results are generally obtained when the base and tin compound are each substantially uniformly dispersed in the reaction mixture in a concentration of at least about 0.01% by weight of the aromatic dicarboxylic acid in the mixture. Although relatively large amounts of the tin compound (e.g. up to 5% or more) can be present in the mixture, it is generally most convenient to carry out the process of this invention in the presence of from about 0.01% to about 1% of the tin compound by weight of the aromatic dicarboxylic acid in the mixture.

In general, the amount of the organic base that is initially present in the mixture is preferably not more than an amount that can be substantially removed from the mixture by a convenient method, e.g. by volatilization, prior to polycondensation of the esterification product. While the process can be satisfactorily carried out with a reaction mixture containing more than 1% of the base, the difficulties inherent in removal of that amount of the base from the esterification product may result in the presence of an undesirably large residue of the base in the subsequent polycondensation product and consequent discoloration of the ultimate polymeric product. Hence, for use in the process of this invention, the organic base is preferably present in the reaction mixture in a concentration of from about 0.01% to 1%, and even more desirably between 0.2% and 1%, by weight of the aromatic dicarboxylic acid in the mixture.

In general, the present invention encompasses the use of the organic base and tin compound in any relative proportions which accelerate the desired esterification reaction with suppression of undesirable ether-forming reactions. Thus, the relative proportions of organic base and tin compound can be varied over a rather wide range such as, for example, from one to 99 parts of either of the two components in a total of 100 parts of the two-component catalyst system. More specifically, relative proportions of from 10 to 90 parts of each of the two components are generally utilized and, even more specifically, highly suitable results are usually obtained by use of the two-component catalyst system in which the components are present in substantially equal parts by weight.

In general, the acid-glycol reaction mixture containing an organic base and a tin compound can be esterified under any conditions suitable for achieving the desired degree of esterification. As aforesaid, the process can be advantageously carried out at a reaction temperature of at least the normal boiling point of the glycol, e.g. at a temperature of from about 240° to about 320° C., and at a pressure above the partial vapor pressure of the glycol in the mixture at the reaction temperature. In a particularly preferred embodiment, the process is carried out by heating the reaction mixture in a first stage to a temperature of at least the normal boiling temperature of the glycol and at a pressure in the range of from the partial vapor pressure of the glycol in the mixture to the sum of the partial vapor pressures of the glycol and water in the mixture at the reaction temperature until a substantial proportion of the acid groups initially present in the mixture have been esterified, and more specifically up to about 50 to about 85% esterification, and then maintaining the reaction mixture from the first stage at a temperature of at least the normal boiling point of the glycol and at a pressure in the aforementioned range but lower than the pressure of said first stage until at least 95% of the acid groups initially present in the mixture have been esterified. In such a preferred embodiment, and particularly when use is made of a relatively low mole ratio of the glycol to the aromatic dicarboxylic acid, the second stage can be advantageously carried out by reducing the pressure, either continuously or incrementally, until a substantially atmospheric pressure is attained, while maintaining the reaction temperature above the normal boiling temperature of the glycol. In general, such an embodiment is preferred because it provides an esterification product which, when subjected to conventional polycondensation conditions, results in a polymeric product of higher molecular weight.

Thus, in a specific embodiment by which the process of this invention may be illustrated, a reaction mixture containing ethylene glycol, an aromatic dicarboxylic acid such as terephthalic acid, and small amounts of an organic base and a tin compound is maintained at a temperature of 260–280° C. and a pressure of 90–130 p.s.i.g. until 75%–85% of the acid groups in the mixture have been esterified. The mixture is then maintained at 260–280° C. while the reaction pressure is lowered to 20–45 p.s.i.g. and thereafter gradually or incrementally to approximately one atmosphere, at which pressure the mixture is maintained until the desired degree of esterification is reached.

Use of an organic base and a tin compound under esterification reaction conditions, as illustrated by esterification of terephthalic acid with a glycol, provides a reaction product containing monomeric and/or oligomeric glycol terephthalates that are highly suitable for polymerization. In an illustrative process for the polymerization of such glycol terephthalates, all or a suitable portion of the tin compound can be retained in the mixture for use as a polycondensation catalyst, or another suitable polycondensation catalyst such as antimony trioxide can be added to the reaction mixture before or after the esterification step has taken place. Approximately 0.025 to 0.05% by weight of the polycondensation catalyst, based on the terephthalic acid originally present in the mixture is preferred. At a polycondensation temperature of about 280° C., the pressure is gradually reduced to below 10 mm. Hg and preferably to below 1 mm. Hg. Nitrogen or other inert gas can be used to sparge the reaction mixture throughout all or a portion of the polycondensation operation. The rate of pressure reduction and the rate of sparging, when employed, are controlled to minimize volatilization of polymer precursors during glycol removal, and polycondensation conditions are maintained until a polymer of the desired molecular weight, as determined by its viscosity or other physical measurements, is obtained.

Thereafter, the pressure in the polycondensation reactor is raised by means of an inert gas and the polymer melt is discharged from the reactor through a die plate. The resulting strands are cooled and chopped into pellets suitable for remelting. Alternatively, the polymer melt can be conducted directly to an extruder or other polymer processing machinery and converted to finished articles such as film or fibers.

The invention may be more clearly understood by reference to the following examples, which are included to illustrate specific catalyst systems and procedures with which the process of this invention can be carried out but which should not be regarded as limiting the invention claimed herein, as those skilled in the art will readily appreciate.

EXAMPLE I.—NO CATALYST

Ethylene glycol and terephthalic acid were blended to form a raction mixture containing 1.5 moles of the glycol per mole of acid. The mixture was divided among and sealed in several stainless steel reaction vessels which were rapidly heated to 280° C., maintained at that temperature for various periods of time, and then quenched in cold water. The results obtained by thereafter analyzing the contents of the reaction vessels are set forth in the following table in which "percent esterification" represents the percentage of initially present acid groups that were esterified by the procedure of this example, and "percent of by-product ether" represents the percentage of diethylene glycol that was present in the mixture after esterification had been carried out to the indicated extent.

| Percent esterification: | Percent of by-product ether |
|---|---|
| 8.4 | 0.6 |
| 15.4 | 0.8 |
| 23.1 | 1.1 |
| 32.1 | 1.6 |

EXAMPLE II.—ORGANO-TIN CATALYST

The procedure of Example I was repeated with the exception that the reaction mixture initially contained 0.5% of stannous oxalate by weight of the terephthalic acid in the mixture. The results are set forth in the following table.

| Percent esterification: | Percent of by-product ether |
|---|---|
| 8.3 | 0.11 |
| 38.6 | 0.48 |
| 45.1 | 0.70 |
| 53.2 | 1.20 |

EXAMPLE III.—PRIMARY AMINE CATALYST

The procedure of Example I was repeated with the exception that the reaction mixture initially contained 0.5% of n-butylamine by weight of the terephthalic acid in the mixture. The results are set forth in the following tables.

| Percent esterification: | Percent of by-product ether |
|---|---|
| 19.4 | 0.12 |
| 32.8 | 0.34 |
| 44.3 | 0.50 |
| 47.3 | 0.60 |
| 48.8 | 0.80 |

EXAMPLE IV.—SECONDARY AMINE CATALYST

The procedure of Example I was repeated with the exception that the reaction mixture initially contained 0.5% of diisopropylamine by weight of the terephthalic acid in the mixture. The results are set forth in the following table.

| Percent esterification: | Percent of by-product ether |
|---|---|
| 19.8 | 0.15 |
| 23.8 | 0.40 |
| 48.0 | 0.60 |
| 52.4 | 1.00 |

EXAMPLE V.—ORGANO-TIN AND PRIMARY AMINE CATALYSTS

The procedure of Example I was repeated with the exception that the reaction mixture initially contained 0.25% of stannous oxalate and 0.25% of n-butylamine by weight of the terepthalic acid in the mixture. The results are set forth in the following table.

| Percent esterification: | Percent of by-product ether |
|---|---|
| 16.3 | <0.10 |
| 32.7 | 0.16 |
| 42.7 | 0.33 |
| 48.8 | 0.60 |
| 52.3 | 0.70 |

EXAMPLE VI.—ORGANO-TIN AND SECONDARY AMINE CATALYSTS

The procedure of Example I was repeated with the exception that the reaction mixture initially contained 0.25% of stannous oxalate and 0.25% of diisopropylamine by weight of the terepthalic acid in the mixture. The results are set forth in the following table.

| Percent esterification: | Percent of by-product ether |
|---|---|
| 3.0 | <0.1 |
| 16.1 | <0.1 |
| 21.3 | <0.1 |
| 40.9 | 0.4 |
| 45.4 | 0.4 |
| 48.8 | 0.3 |
| 50.5 | 0.4 |

Figure 2:
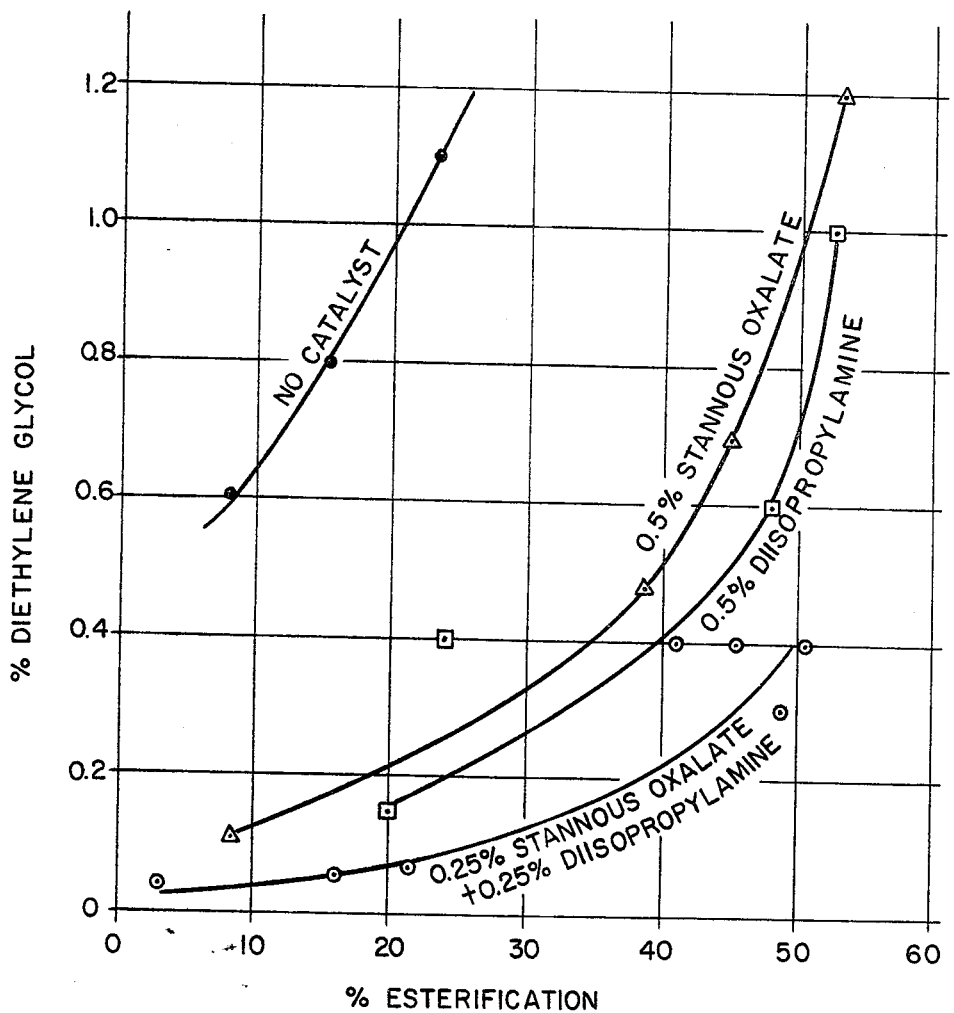

In order to more clearly demonstrate the significance of the preceding examples, the results obtained therein have been graphically illustrated in the drawings in which FIGURE 1 represents the percentage of the undesirable diethylene glycol by-product that was present at different degrees of esterification of the acid groups initially present in the reaction mixtures of Examples I, II, III and V, which mixtures contained terepthalic acid, ethylene glycol and, respectively, no catalyst, 0.5% of stannous oxalate, 0.5% of n-butylamine, and 0.25% each of n-butylamine and stannous oxalate. FIGURE 2 similarly represents the percentage of the undesirable diethylene glycol by-product that was present at different degrees of esterification of the acid groups initially present in the reaction mixtures of Example I, II, IV and VI, which mixtures contained terephthalic acid, ethylene glycol and, respectively, no catalyst, 0.5% of stannous oxalate, 0.5% of diisopropylamine, and 0.25% each of diisopropylamine and stannous oxalate.

From the results of the preceding examples, and particularly as they are illustrated in the drawings, it will be apparent that carrying out the process of this invention in the presence of an organic base and an organo-tin compound results in a ratio of esterification reactions to by-product ethers that is substantially higher than that obtained without the use of such catalyst and, moreover, significantly higher than that obtained under the same conditions with an equivalent amount of only the organo-tin compound or the organic base.

Although the process of this invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

We claim:

1. A process for the esterification of an aromatic dicarboxylic acid with a glycol, which comprises heating a mixture of the aromatic dicarboxylic acid and at least 1 mole of an alkylene glycol per mole of the acid under esterification conditions and in the presence of an alkylamine and of a tin compound of the group consisting of oxalates, alkoxides and oxides of tin containing at least one tin-to-oxygen bond.

2. A process, as defined in claim 1, in which the aromatic dicarboxylic acid is terephthalic acid.

3. A process, as defined in claim 1, in which the glycol is a lower alkylene glycol.

4. A process, as defined in claim 1, in which the glycol is ethylene glycol.

5. A process, as defined in claim 1, in which the normal boiling point of the alkylamine is lower than that of the glycol.

6. A process, as defined in claim 1, in which the alkylamine is a lower alkylamine.

7. A process, as defined in claim 1, in which the alkylamine is n-butylamine.

8. A process, as defined in claim 1, in which the alkylamine is diisopropylamine.

9. A process, as defined in claim 1, in which the tin compound is a compound of divalent tin.

10. A process, as defined in claim 1, in which the tin compound is stannous oxalate.

11. A process, as defined in claim 1, in which the alkylamine and the tin compound are each present in a concentration of at least about 0.01% by weight of the aromatic dicarboxylic acid in the mixture.

12. A process, as defined in claim 1, in which the alkylamine is present in a concentration between about 0.2% and about 1% by weight of the aromatic dicarboxylic acid in the mixture.

13. A process, as defined in claim 1, in which the tin compound is present in a concentration of from about 0.01% to about 1% by weight of the aromatic dicarboxylic acid in the mixture.

14. A process, as defined in claim 1, in which the tin compound and the alkylamine are present in relative proportions that are productive of esterification products in a ratio to by-product ethers that is higher than that obtained by the separate use of an equivalent amount of either the alkylamine or the tin compound.

15. A process, as defined in claim 1, in which the alkylamine and the tin compound are each present in a proportion of from about one to about 99 parts in a total of 100 parts of the alkylamine and the tin compound.

16. A process, as defined in claim 1, in which the alkylamine and the tin compound are each present in a proportion of from about 10 to about 90 parts in a total of 100 parts of the alkylamine and the tin compound.

17. A process, as defined in claim 1, in which the esterification conditions include a temperature of at least the normal boiling point of the glycol and a pressure of at least the partial vapor pressure of the glycol in said mixture at said temperature.

References Cited

UNITED STATES PATENTS

| | | | |
|---|---|---|---|
| 3,050,533 | 8/1962 | Munro et al. | 260—475 |
| 3,060,223 | 10/1962 | McKinney | 260—475 |

LORRAINE A. WEINBERGER, Primary Examiner

E. J. SKELLY, Assistant Examiner

U.S. Cl. X.R.

260—75